(12) United States Patent
Van Wie

(10) Patent No.: US 11,647,088 B2
(45) Date of Patent: *May 9, 2023

(54) MANAGING INTERACTIONS IN A NETWORK COMMUNICATIONS ENVIRONMENT

(71) Applicant: Sococo, Inc., Austin, TX (US)

(72) Inventor: David Van Wie, Eugene, OR (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,153

(22) Filed: Jul. 1, 2021

(65) Prior Publication Data

US 2021/0329095 A1 Oct. 21, 2021

Related U.S. Application Data

(63) Continuation of application No. 16/657,562, filed on Oct. 18, 2019, now abandoned, which is a continuation of application No. 15/788,719, filed on Oct. 19, 2017, now Pat. No. 10,455,051, which is a continuation of application No. 12/631,026, filed on Dec. 4, 2009, now Pat. No. 9,813,522.

(60) Provisional application No. 61/120,384, filed on Dec. 5, 2008.

(51) Int. Cl.
*G06F 15/173* (2006.01)
*H04L 67/306* (2022.01)
*G06Q 10/10* (2023.01)

(52) U.S. Cl.
CPC .......... *H04L 67/306* (2013.01); *G06Q 10/10* (2013.01)

(58) Field of Classification Search
CPC .............................. H04I 67/306; G06Q 10/10
See application file for complete search history.

(56) References Cited

U.S. PATENT DOCUMENTS 9,813,522 B2 * 11/2017 Van Wie ............... H04L 67/306
10,455,051 B2 * 10/2019 Van Wie ............... H04L 67/306

* cited by examiner

*Primary Examiner* — Yves Dalencourt

(57) ABSTRACT

A network communications environment has advanced interaction management functionality that enables the opportunities for users to interact with one another to be expanded beyond the opportunities that exist with closed interaction management approaches while still providing reasonable privacy and security protections that are not available with open interaction management approaches. The advanced interaction management functionality also encourages the proliferation of trust-based interactions.

18 Claims, 8 Drawing Sheets

MANAGING INTERACTIONS IN A NETWORK COMMUNICATIONS ENVIRONMENT

CROSS-REFERENCE TO RELATED APPLICATIONS

Under 35 U.S.C. § 119(e), this application claims the benefit of U.S. Provisional Application No. 61/120,384, filed Dec. 5, 2008, the entirety of which is incorporated herein by reference.

This application relates to the following patent applications, the entirety of each of which is incorporated herein by reference:

U.S. patent application Ser. No. 12/418,243, filed Apr. 3, 2009;
U.S. patent application Ser. No. 11/923,629, filed Oct. 24, 2007; and
U.S. patent application Ser. No. 11/923,634, filed Oct. 24, 2007.

BACKGROUND OF THE INVENTION

A primary goal of online social networking systems is to create an environment in which users can interact with each other, for example, by communicating, sharing files, and concurrently viewing the same online content. Some social networking systems are open to people who are members of the same preexisting groups or organizations to create closed communities, whereas other social networking systems are open to all users to create open communities. As users interact in a social networking environment, they naturally form relationships. Most social networking systems allow a pair of users to expressly declare their shared relationship to the system through a confirmation process that requires both users to confirm the relationship declaration. Other social networking systems allow users to unilaterally declare their relationships with others. The explicit relationship declarations oftentimes are used to implement privacy controls that restrict who can view a user's profile and who can communicate with the user.

Each user of a social networking system typically creates a profile that identifies the user's characteristics and preferences. A social networking system typically does not verify a user's assertions about his or her identity characteristics (e.g., name, gender, age, profession, or geographic location). As a result, there is a significant risk that users will misrepresent who they are to the system and to those with whom they interact. This risk tends to discourage social and commercial interactions that rely on trust. Social networking systems have attempted to ameliorate this risk by deriving trust ratings from information about the reputations of users or commercial vendors and providing these trust ratings to other users for use in deciding how to conduct their interactions with others in the online social environment.

What are needed are systems and methods for managing interactions in a network communications environment that expand opportunities for forming relationships and that encourage trusting interactions among participants.

BRIEF SUMMARY OF THE INVENTION

In one aspect, the invention features a method in accordance with which records describing realtime network interactions between a user and other communicants in one or more virtual areas of a network communications environment are queried. One or more relationship attribute values are determined. Each of the attribute values characterizes a respective social network tie between the user and a respective one of the other communicants. The process of determining the relationship attribute values includes deriving the one or more relationship attribute values based on (i) a statistical analysis of results of the querying describing concurrent interactions between the user and one or more of the other communicants in at least one of the virtual areas and (ii) one or more place attribute values characterizing the at least one virtual area in which the concurrent interactions occurred. The one or more relationship attribute values are stored in at least one computer-readable medium.

Communicant interactions in the network communications environment are managed based on the one or more relationship attribute values. The process of managing the communicant interactions includes receiving a first network communication from a network node at which one of the user and the other communicants is operating, where the first network communication includes a request for an interaction in the network communications environment. The process of managing the communicant interactions also includes transmitting a second network communication enabling the requested interaction in response to satisfaction of a condition dependent at least in part on the one or more relationship attribute values.

In another aspect, the invention features a method in accordance with which records describing realtime network interactions between a user and other communicants in one or more virtual areas of a network communications environment are queried. One or more relationship level attribute values are determined. Each of the relationship level attribute values specifies a respective level of relationship that the user has with a respective one of the other communicants, wherein the determining comprises deriving the one or more relationship level attribute values from a statistical analysis of results of the querying describing concurrent interactions between the user and one or more of the other communicants in at least one of the virtual areas. The one or more relationship level attribute values are stored in at least one computer-readable medium. Communicant interactions in the network communications environment are managed based on the one or more relationship level attribute values. The process of managing the communicant interactions includes receiving a first network communication from a network node at which one of the user and the other communicants is operating, where the first network communication includes a request for an interaction in the network communications environment. The process of managing the communicant interactions also includes transmitting a second network communication enabling the requested interaction in response to satisfaction of a condition dependent at least in part on the one or more relationship level attribute values.

In another aspect, the invention features a method in accordance with which records describing realtime network interactions between a user and other communicants in one or more virtual areas of a network communications environment are queried. One or more trust level attribute values are determined. Each of the trust level attribute values specifies a respective level of trust that is associated with the user. The process of determining the trust level attribute values includes deriving the one or more trust level attribute values from a statistical analysis of results of the querying describing concurrent interactions between the user and one or more of the other communicants in at least one of the virtual areas. The one or more relationship attribute values are stored in at least one computer-readable medium. Communicant interactions in the network communications environment are managed based on the one or more trust level attribute values. The process of managing the communicant interactions includes receiving a first network communication from a network node at which one of the user and the other communicants is operating, where the first network communication includes a request for an interaction in the network communications environment. The process of managing the communicant interactions also includes transmitting a second network communication enabling the requested interaction in response to satisfaction of a condition dependent at least in part on the one or more trust level attribute values.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

Figure 1:
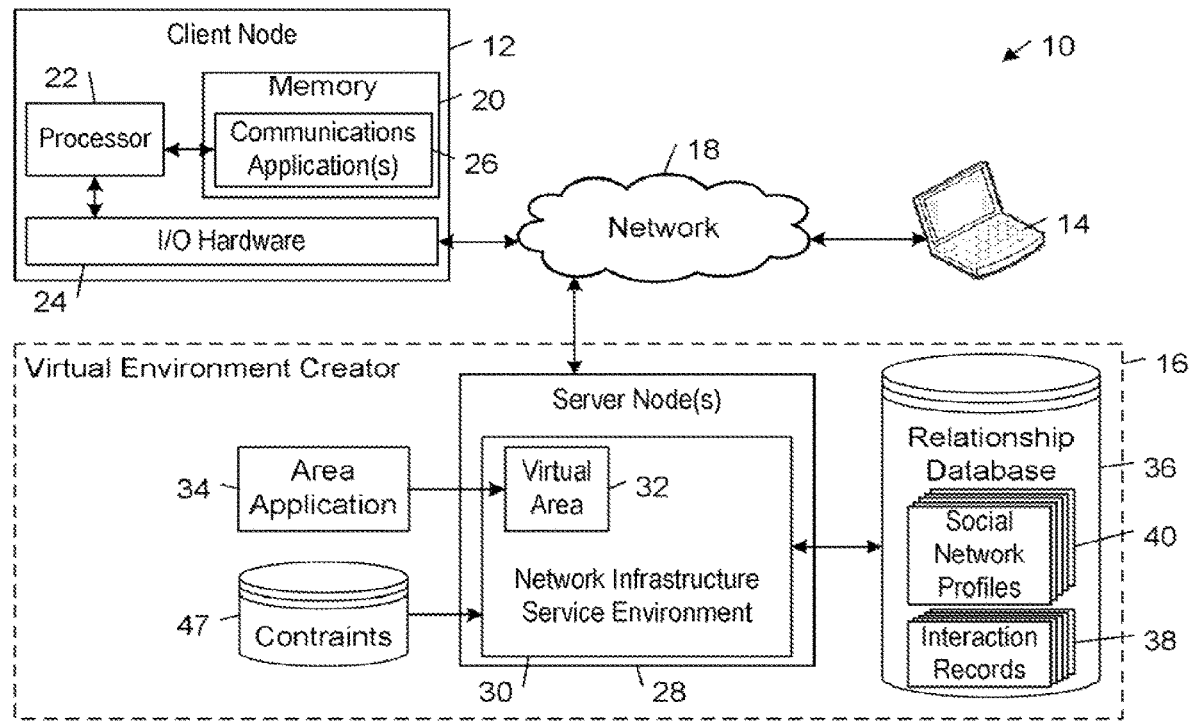
FIG. 1 is a diagrammatic view of an embodiment of a network communication environment that includes a first client network node, a second client network node, and a virtual environment creator.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "social network" is a social structure or map of nodes that are connected by one or more types of interdependency. The "nodes" represent individual entities (e.g., individual communicants, groups of communicants, or organizations) in the network. A social network "tie" represents a relationship between a pair of entities in a social network. The nodes may be interconnected by a variety of different types of ties. A social network "profile" is a set of data that are associated with a single user. These data may include attributes that identify the user (e.g., user name, age, gender, geographic location), attributes that identify the user's friends and acquaintances, attributes that identify the user's interests (e.g., favorite music, books, movies, sports, foods), and attributes that specify the users preferences (e.g., restrictions on how the system controls access to resources that are associated with the user). A "resource" refers to any type of information (e.g., a web page, a file, streaming data, and presence data) or service (e.g., a service that establishes a communications link with another user) that is, accessible over a network. A resource may be identified by a uniform resource identifier (URI).

A "contact" of a user is a communicant or other person that is connected to the user by either an explicit social network tie that is declared by at least one of the user and the contact (and optionally confirmed by the other) or by a social network tie that is inferred from interactions between the user and the person. A "realtime contact" of a user is a contact who has communicated with the user via a realtime communications platform.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that durably stores data for use by a software application.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network.

Exemplary network nodes include, but not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded).

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

In the context of a virtual area, an "object" is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

The term "statistical analysis" refers to a process of analyzing data for the purpose of making generalizations or inferences, determining values of variables of a predictive model, determining one or more metrics that summarize the data, or classifying one or more aspects or subjects of the data.

A "predicate" is a conditional part of a rule. An "access control predicate" is a predicate that conditions access (typically to a resource) on satisfaction of one or more criteria.

As used herein, the term "includes" means includes but not limited to, the term "including" means including but not limited to, and "based on" means based at least in part on.

II. Introduction

The embodiments that are described herein provide a network communications environment with advanced interaction management functionality.

Some embodiments that are described herein provide a middle ground between open interaction management approaches that allow users to interact with one another without restriction and closed interaction management approaches that only allow users with relationships that are explicitly defined by the users to interact with one another. In particular, these embodiments infer the existence of social network ties from realtime communicant interactions in the network communications environment. In addition, these embodiments also infer relationship attribute values from such interactions, where the relationship attribute values characterize the social network ties in terms of, for example, relationship type and level. In this way, these embodiments enable the opportunities for users to interact with one another to be expanded beyond the opportunities that exist with closed interaction management approaches while still providing reasonable privacy and security protections that are not available with open interaction management approaches.

Some embodiments that are described herein infer trust levels from realtime interactions between communicants in one or more virtual areas. In some embodiments, the trust levels may be assigned to communicants or to the declarations that are contained in communicants' social network profiles. In some of these embodiments, the trust levels are used to manage communicant interactions with each other and with virtual areas, and to provide trust recommendations to communicants for the purpose of encouraging the proliferation of trust-based interactions.

III. Overview

A. Introduction

FIG. 1 shows an embodiment of an exemplary network communications environment 10 that includes a first client network node 12, a second client network node 14, and a virtual environment creator 16 that are interconnected by a network 18. The first client network node 12 includes a computer-readable memory 20, a processor 22, and input/output (I/O) hardware 24. The processor 22 executes at least one communications application 26 that is stored in the memory 20. The second client network node 14 typically is configured in substantially the same way as the first client network node 12. The virtual environment creator 16 includes at least one server network node 28 that provides a network infrastructure service environment 30. The communications application 26 and the network infrastructure service environment 30 together provide a platform for creating a virtual environment.

In some embodiments, the network infrastructure service environment 30 manages sessions of the first and second client nodes 12, 14 in a virtual area 32 in accordance with a virtual area application 34. The virtual area application 34 is hosted by the virtual area 32 and includes a description of the virtual area 32. The communications applications 26 operating on the first and second client network nodes 12, 14 present respective views of the virtual area 32 in accordance with data received from the network infrastructure service environment 30 and provide an interface for receiving commands from the communicants. The communicants typically are represented in the virtual area 32 by respective avatars, which move about the virtual area 32 in response to commands that are input by the communicants at their respective network nodes. Each communicant's view of the virtual area 32 typically is presented from the perspective of the communicant's avatar, which increases the level of immersion experienced by the communicant. Each communicant typically is able to view any part of the virtual area 32 around his or her avatar. In some embodiments, the communications applications 26 establish realtime data stream connections between the first and second client network nodes 12, 14 and other network nodes sharing the virtual area 32 based on the positions of the communicants' avatars in the virtual area 32.

The network infrastructure service environment 30 also maintains a relationship database 36 that contains records 38 of interactions between communicants and social network profiles 40 that are associated with respective communicants. Each interaction record 38 describes the context of an interaction between a pair of communicants. Each social network profile 40 includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

Figure 2:
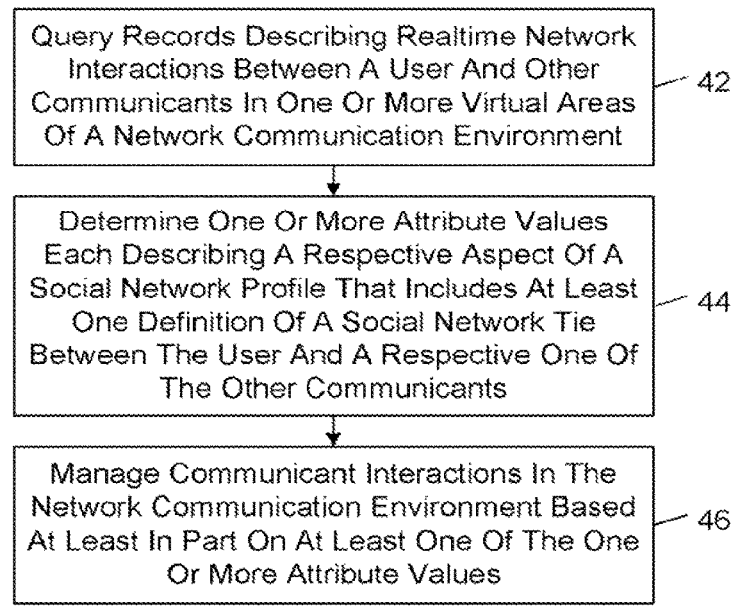
FIG. 2 is a flow diagram of an embodiment of an interaction management method.

FIG. 2 shows an exemplary embodiment of a method by which the network infrastructure service environment 30 manages communicant interactions with each other and with the virtual areas of the virtual environment created by the virtual environment creator 16 based on results of queries on the relationship database 36.

In accordance with the method of FIG. 2, the network infrastructure service environment 30 queries interaction records 38 describing realtime network interactions between a user and other communicants in one or more virtual areas of the network communications environment (FIG. 2, block 42). In this process, the network infrastructure service environment 30 typically queries the relationship database 36 for interaction records 38 describing concurrent interactions between communicants in at least one of the virtual areas of the virtual environment that is created by the virtual environment creator 16.

Based on results of the querying, the network infrastructure service environment 30 determines one or more attribute values each of which describes a respective aspect of a social network profile 40 that includes at least one definition of a social network tie between the user and a respective one of the other communicants (FIG. 2, block 44).

In some embodiments, the attribute values characterize respective social network ties between the user and other communicants. For example, based on a statistical analysis of query results that describe concurrent interactions between the user and one or more other communicants in at least one virtual area, the network infrastructure service 30 may infer that the user is tied to a particular one of the other communicants. The network infrastructure service 30 also may infer a relationship type attribute value that specifies a type of the social network tie, as well as a relationship level attribute value that specifies a degree or strength of relationship between the user and the other communicant. Exemplary social network tie types include a kinship type (e.g., father-of, cousin-of), an affective type (e.g., respects, likes), a cognitive type (e.g., friends-with, acquaintance-of), and social role type (e.g., teacher-of, works-with). The relationship level attribute value may correspond to a numerical value that is normalized to a particular scale (e.g., a number between zero and one) or it may correspond to a class label that is selected from a relationship level taxonomy (e.g., a level of "friendship" taxonomy, such as: best friends, good friends, friends, acquaintances, hasn't met). In some embodiments, the network infrastructure service 30 may infer a trust level attribute value that specifies a level of trust that is associated either with the user as a whole or with one or more declarations that are asserted by the user in connection with the user's interactions in the network communications environment. The trust level attribute value may correspond to a numerical value that is normalized to a particular scale (e.g., a number between zero and one, or an integer number of stars in a five star rating taxonomy) or it may correspond to a class label that is selected from a trust level taxonomy (e.g., very trustworthy, trustworthy, untrustworthy, very untrustworthy).

The attribute values that are inferred from the query results may be used to create new identity or relationship attribute values in the social network profile 40 or they may be used to modify or complement any explicit identity or relationship attribute values in the user's social network profile 40.

Referring back to FIG. 2, the network infrastructure service environment 30 manages communicant interactions in the network communications environment 10 based on the one or more attribute values (FIG. 2, block 46). For example, the network infrastructure service environment 30 may restrict which communicants can access resources (e.g., a personal virtual area, such as the users HomeSpace; music, documents, and other data files; personal profile information; and presence information) that are associated with the user. The network infrastructure service environment 30 also may restrict which communicants can contact the user (e.g., only those communicants who have an explicit tie or an inferred tie with the user may contact the user). In some embodiments, the network infrastructure service environment 30 filters messages (e.g., electronic mail messages, chat messages, whisper messages) sent to the user based on the one or more attribute values. In some embodiments, the network infrastructure service environment 30 manages communicant interactions with the virtual areas of the virtual environment based on the one or more attribute values. For example, the network infrastructure service environment 30 may restrict which communicants can enter a virtual area based on the one or more inferred trust levels that are associated with the user or with one or more of the user's identity assertions (e.g., only those communicants who are associated with an age declaration that is above a specified age threshold and has an inferred trust level above a specified confidence level may enter an adult entertainment virtual area). In some embodiments, the network infrastructure service environment restricts which virtual areas of the virtual environment are visible to the communicants based on the respective inferred trust levels that are associated with the communicants or their respective identity assertions.

B. An Exemplary Operating Environment

1. Network Environment

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

The communications application 26 (see FIG. 1) typically operates on a client network node that includes software and hardware resources which, together with administrative policies, user preferences (including preferences regarding the exportation of the user's presence and the connection of the user to areas and other users), and other settings, define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24, 2007.

2. Network Infrastructure Services

The network infrastructure service environment 30 typically includes one or more network infrastructure services that cooperate with the communications applications 26 in the process of establishing and administering network connections between the client nodes 12, 14 and other network nodes (see FIG. 1). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 30 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 10.

Area Service

The area service administers virtual areas. In some embodiments, the area service remotely configures the communications applications 26 operating on the first and second client network nodes 12, 14 in accordance with the virtual area application 34 subject to a set of constraints 47 (see FIG. 1). The constraints 47 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 32. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 32 on the client network node in accordance with the virtual area application 34. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences, which typically are specified in the social network profiles 40.

Interaction Service

The interaction service maintains the relationship database 36 that contains the records 38 of interactions between communicants and the social network profiles 40 that are associated with respective communicants. For every interaction between communicants, one or more services of the network infrastructure service environment 30 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared. Each social network profile 40 includes data that describes identity characteristics, explicit relationship information, and inferred relationship information for a respective communicant.

The interaction service also supports queries on the relationship database 36 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 36 can be combined with other searches. For example, queries on the relationship database may be combined with queries on contact history data generated for interactions with contacts using a communication system (e.g., Skype, Facebook, and Flickr) that is outside the domain of the network infrastructure service environment 30.

3. Virtual Areas

The communications application 26 and the network infrastructure service environment 30 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

Figure 3:
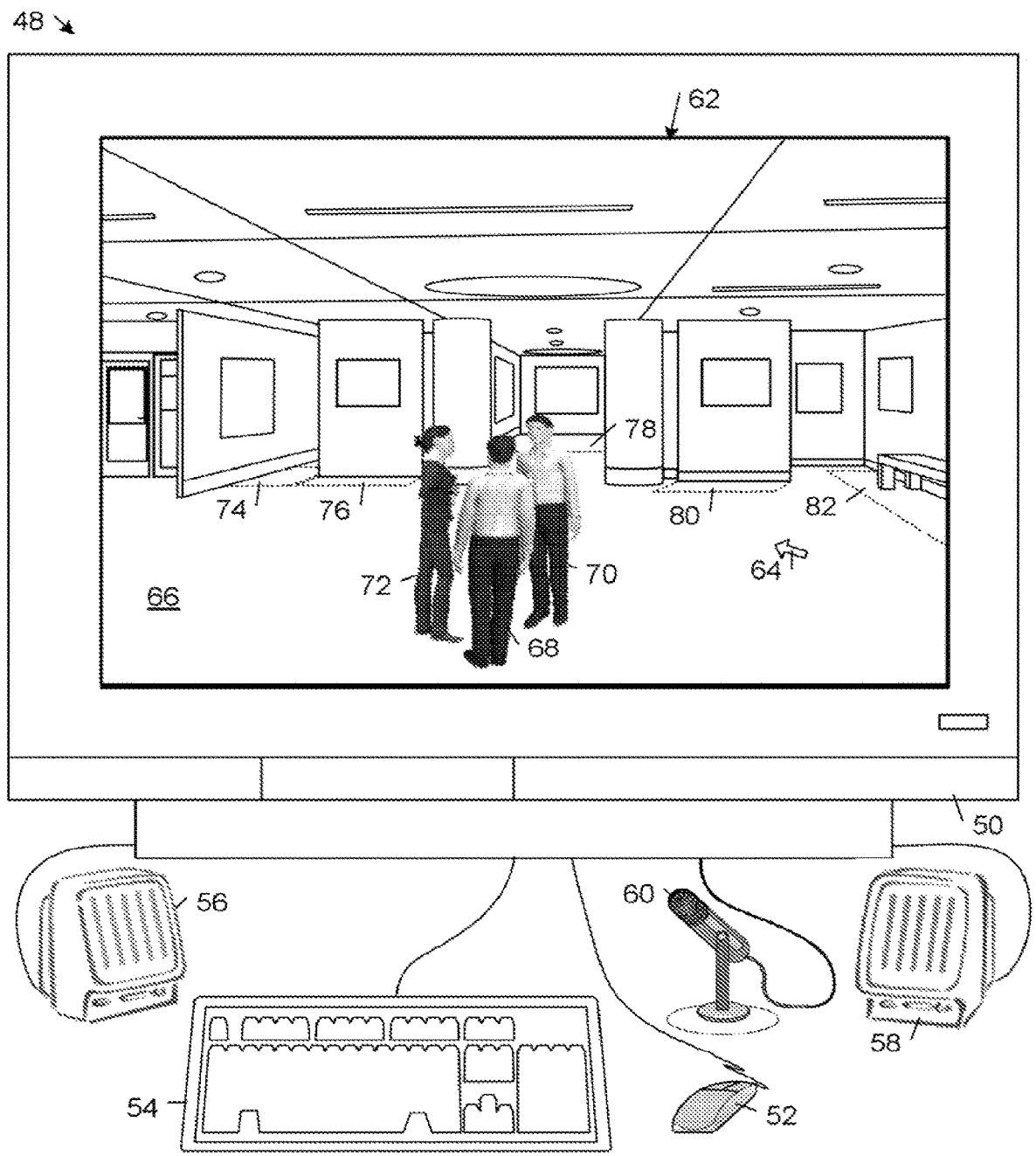
FIG. 3 is a diagrammatic view of an embodiment of a network node that includes a graphical user interface presenting a depiction of a virtual area.

FIG. 3 shows an embodiment of an exemplary network node that is implemented by a computer system 48. The computer system 48 includes a display monitor 50, a computer mouse 52, a keyboard 54, speakers 56, 58, and a microphone 60. The display monitor 50 displays a graphical user interface 62. The graphical user interface 62 is a windows-based graphical user interface that can include multiple windows, icons, and a pointer 64. In the illustrated embodiment, the graphical user interface 62 presents a two-dimensional depiction of a shared virtual area 66 that is associated with a three-dimensional visualization representing an art gallery. Communicants are represented in the virtual area 66 by respective avatars 68, 70, 72, each of which may have a respective role (e.g., a curator, an artist, and a visitor) in the context of the virtual area 66.

As explained in detail below, the virtual area 66 includes zones 74, 76, 78, 80, 82 that are associated with respective rules that govern the switching of realtime data streams between the network nodes that are represented by the avatars 68-72 in the virtual area 66. (During a typical communication session, the dashed lines demarcating the zones 74-82 in FIG. 3 are not visible to the communicants although there may be visual cues associated with such zone boundaries.) The switching rules dictate how local connection processes executing on each of the network nodes establishes communications with the other network nodes based on the locations of the communicants' avatars 68-72 in the zones 74-82 of the virtual area 66.

A virtual area is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 April 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the document, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 61/042,714 (which was filed on Apr. 4, 2008), Ser. No. 11/923,629 (which was filed on Oct. 24, 2007), and Ser. No. 11/923,634 (which was filed on Oct. 24, 2007).

4. Communications Application

In some embodiments, the communications application 26 includes:

a. a Heads-Up Display (HUD) software application;
b. local Human Interface Device (HID) and audio playback devices;
c. a So3D graphical display, avatar, and physics engine;
d. a system database and storage facility.

a. Heads-Up Display (HUD)

The Heads-up Display (HUD) is an application that operates on each client network node. The HUD is a small, lightweight interface that a user can keep up and running all the time on his or her desktop. It is the user's interface for launching virtual area applications, providing him or her with immediate access to realtime contacts and realtime collaborative places (or areas). The HUD is integrated with realtime communications applications and/or realtime communications components of the underlying operating system such that the HUD can initiate and receive realtime communications with other network nodes. A virtual area is integrated with the user's desktop through the HUD such that the user can drag and drop files into the virtual environment created by the virtual area creator 16, use files stored in association with the virtual area using the native client software applications independently of the virtual environment while still present in a virtual area, and more generally treat presence and position within a virtual area as an aspect of their operating environment analogous to other operating system functions rather than just one of several applications.

Figure 4A:
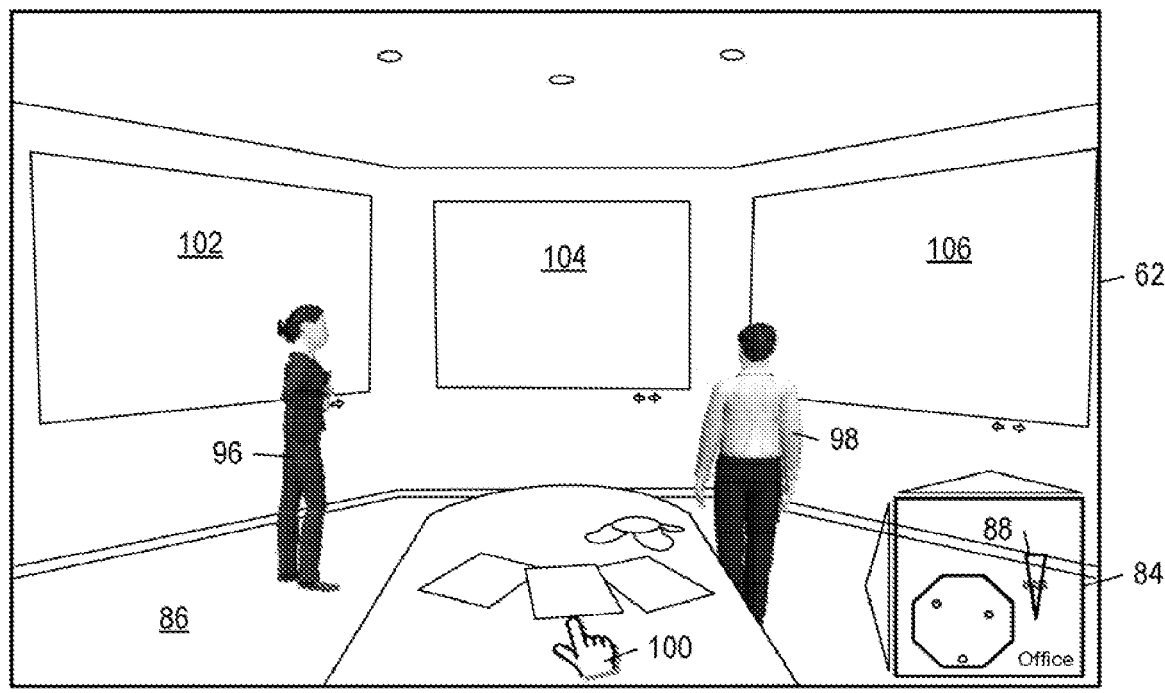
FIG. 4A is a diagrammatic view of an embodiment of a heads-up display (HUD) superimposed on a graphical user interface presenting a depiction of a virtual area.
Figure 4B:
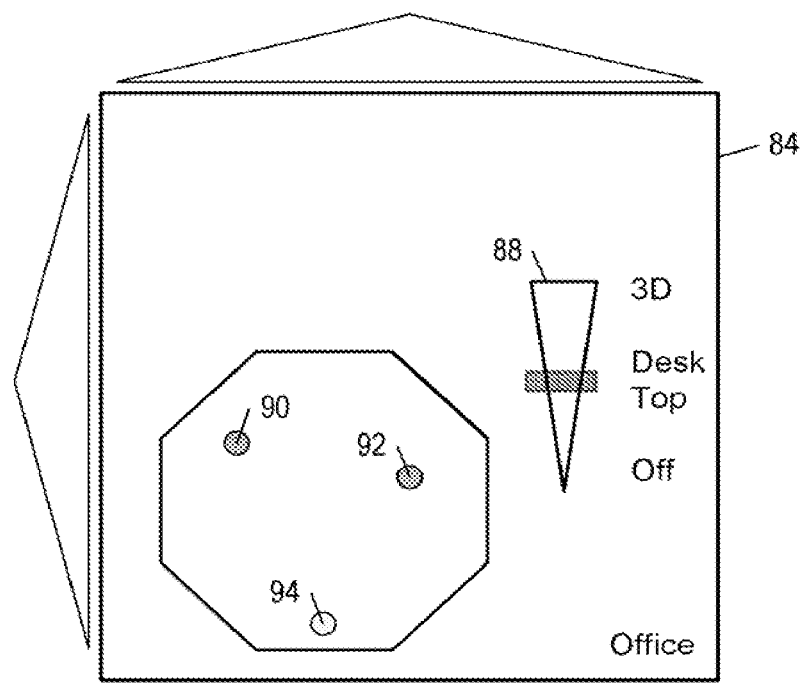
FIG. 4B is a diagrammatic view of the HUD shown in FIG. 4A.

FIGS. 4A and 4B show an embodiment 84 of the HUD that is implemented by a translucent user interface, which is docked in the lower right hand corner of the communicant's desktop. The HUD 84 is the application interface to the platform. Characteristics of the HUD 84 include:

Small, lightweight application that is intended to be running all the time on the user's desktop; and Provides the user with an easy interface to see and interact with contacts as well as the virtual areas where interactions occur.

In this embodiment, the HUD 84 is implemented by a substantially transparent (semi-translucent) user interface overlay that provides a persistent interface and access to controls. In the embodiment shown in FIG. 4A, the HUD 84 is transparent except for a limited set of one or more of the following semi-translucent elements of the interface:

the outline of progressive immersion control;
the outline of user's current location;
the sprites representing realtime contacts in the virtual area 86; and
the line demarcating the border of HUD area.

The communicant is able to work in a normal desktop computing environment while the HUD 84 is running and ready to initiate realtime communications sessions. For example, the communicant may work with other applications, such as Microsoft® Excel®, to create a document that can later be shared in a realtime communications session. The virtual area 86 is integrated with the communicant's desktop such that the communicant can drag and drop files into the virtual area, use files stored in association with the virtual area using native client software applications independently of the virtual area communications environment while still present in a virtual area, and more generally treat presence and position within a virtual area as an aspect of the operating environment analogous to other operating system functions rather than one of several applications.

While the communicant interacts in the virtual area 86, the HUD 84 provides the communicant with independent control over his or her desired visualization. For example, a communicant may display a minimized view of the virtual area (minimized to the lower right-hand corner of the desktop) and participate in an audio conversation with another communicant in the virtual area while working in different application such as Microsoft® Excel®. A communicant then can change his or her visualization schema and enter into a more immersive three-dimensional rendering of the virtual area 86. This is accomplished by changing the setting of the progressive immersion slider 88 in the HUD 84 from "Desktop" to "3D". Once in the 3D visualization mode, the communicant's desktop displays a 3D rendition of the virtual are 86 (as shown in FIG. 4A). The communicants (represented by sprites 90, 92, 94 in the Desktop mode) now take the form of three-dimensional avatars 96, 98, 100, as shown in FIG. 4A.

Figure 4C:
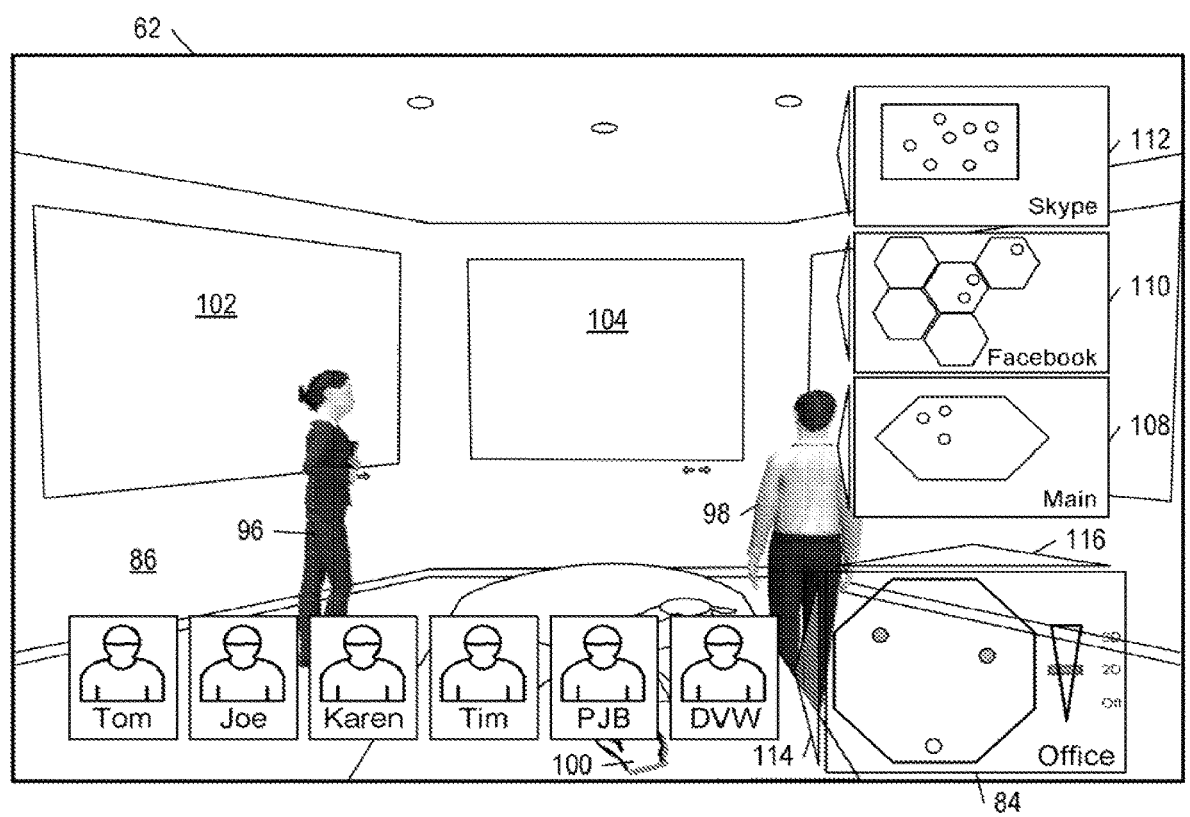
FIG. 4C is a diagrammatic view of an expanded view of the HUD shown in FIG. 4A.

Any data that is associated with the virtual area 86 can be displayed on view screens 102, 104, 106. A view screen is a generic data rendering component that can be used to render any arbitrary data. Examples of the types of data that can be rendered on a view screen include:
Microsoft PowerPoint presentation
Video
output of a Webcam
realtime data that comes directly from an organization's enterprise resource planning (ERP) system As shown in FIG. 4C, the HUD 84 is designed to serve as a true interface that displays information and provides access to controls with only minimal obscuration of the underlying parts of the graphical user interface 62 being presented on the communicant's display monitor. The HUD 84 efficiently shows:
the ones of the communicant's realtime contacts that currently are online,
where the communicant and the communicant's realtime contacts currently are "located" in the virtual area 86,
a progressive immersion control that controls the visualization of the virtual area 86, and
navigation controls that enable the user to quickly connect to a particular place.

In particular, the HUD 84 provides communicants with immediate access to their realtime contacts and the virtual area where realtime collaboration occurs. The HUD 84 allows navigation through areas based on the locations of people as well as views into virtual areas. These virtual areas can be accessed in several ways: most frequently used, most recently used, or an application specific way.

The HUD 84 shows an ordered set of place tiles 108, 110, 112. Clicking on one of the place tiles brings the user to the virtual area represented by the selected place tile. For people, we have a basic metaphor of "go" (to the communicant's area) and Get (bring them to the user's area). This is refined in the HUD 84 by allowing communicants to queue requests to go or get, as well as communicate with people via text or voice without "moving." The HUD 84 notifies the communicant when each communication request is received from another communicant. The communicant can accept the request, ignore it, or add it to a communications queue. In this way, communicants can respond to non-priority communications at a later time. For example, a communicant can queue communications received during a time when the communicant is busy (e.g., engaged in a current communications session) and, after the communicant is free, the communicant can respond to communication requests in the communications queue.

As described above, the interaction service maintains the relationship database 36, which contains interaction records 38 describing who the communicant meets with and where. The interaction service responds to queries on the relationship database 36 with query results that may be presented in a sorted order (e.g., most frequent or most recent) based on place. In this way, the relationship database information can be used to drive a frequency sort of who the communicant met in which areas, as well as sorts of who the communicant has met with regardless of area, and sorts of the areas the communicant has frequented most often. This data is used in the HUD 84. This data also may be used by virtual area application developers as part of a heuristic system that can be implemented by the network infrastructure environment 30. An example of such a heuristic system is a rule that permits people who have visited a particular virtual area more than five times to enter without knocking by default, or people who were present in a virtual area at a particular time to modify and delete files created by another communicant there at the same time.

In FIG. 4C, the HUD 84 presents a series of place tiles 108, 110, 112 that represent respective virtual areas. Each of the virtual areas is tied to queries on the relationship database 36. For example, in some embodiments, for each virtual area the rendezvous service does a query on the relationship database 36 for all of the contacts the user has met with in that virtual area. The rendezvous service typically presents the identified contacts in a list that is sorted either by frequency or by recentness of interaction (e.g., the contact with whom the communicant interacted with last). In other embodiments, the contacts may be sorted in some other application-dependent way.

Queries on the relationship database 36 can be combined with other searches. For example, queries on the relationship database 36 may be combined with queries on contact history data generated for interactions with contacts using another communication system (e.g., Skype, Facebook, and Flickr). In one example, the Skype virtual area 112 may be associated with a query on a communicant's relationship data associated with the Skype virtual area 112 and the communicant's Skype history data to produce a sorted list of realtime contacts of the user that are associated with the Skype virtual area 112.

FIG. 4C shows the basic navigation of contacts and virtual areas in the HUD 84. Clicking on the left-facing arrow associated with each of the virtual area tiles 108-112 displays a list of realtime contacts sorted by frequency of interaction, in a given place. For example, clicking on the left-facing arrow 114 of the main HUD tile 84 (labeled "Office") displays the realtime contacts the user communicates with most frequently in the virtual area 86. The list of contacts (represented by respective icon tiles) is sorted by frequency. The first contact in the list (DVW in this example) represents the contact that the user collaborates with most frequently in the virtual area 86, followed by PJB, Tim, etc. Clicking on the upward-facing arrow 116 displays a set of place tiles representing some or all the virtual areas the communicant has visited. The set of place tiles typically is sorted by frequency, recentness, or other ordering. The virtual area place tiles show the realtime activity currently occurring in the corresponding virtual areas. For example, DVW, Kim and Joe (represented by respective sprites in the Main virtual area tile 108) are all present in the Main virtual area and are having a realtime conversation, whereas, Jeff, Ann and Jane (represented by respective sprites in the virtual area tile 110) are all in the Facebook virtual area.

Should any communicant exit a virtual area or enter a virtual area, the presence indicators (i.e., the sprites shown by circles, which typically are associated with names or other identifiers) in that virtual area automatically will be updated in realtime. This feature demonstrates the ability of a virtual area designer to put application-specific realtime data into a place tile. The place tile may appear either associated with a communicant, or with the communicant's places. For example, a game developer may export a map of where a communicant is in their game environment such that other people connected to that communicant through the relationship database receive a realtime feed of that communicant's current activities. These people can use this virtual area tile to navigate to that communicant, communicate with him or her, or contact him or her (e.g., send an invitation to enter a virtual area). The HUD 84 manages this interface to contacts and virtual areas for many different virtual areas simultaneously.

The realtime data used in the virtual area tiles 84, 108, 110, 112 of the HUD 84 is provided by an interface that is managed by the area service hosting the relevant area. Each area service may provide a different respective virtual area tile data feed to communicants based on the communicants' permissions to view the hosted virtual area. For example, if a communicant enters a virtual area that the communicant does not have permission to view, the HUD 84 may show the virtual area tile with limited or no detailed information. In addition, the virtual area tile data feed that is provided by the hosting area service may be customized by the virtual area provider operating that area service to present an application-specific view of the virtual area to subscribing HUDs.

b. Local Human Interface Device (HID) and Audio Playback Devices

The local HID devices enable a communicant to input commands and other signals into the client network node while participating in a virtual area communications session. Exemplary HID devices include a computer keyboard, a computer mouse, a touch screen display, and a microphone.

The audio playback devices enable a communicant to playback audio signals that are received during a virtual area communications session. Exemplary audio playback devices include audio processing hardware (e.g., a sound card) for manipulating (e.g., mixing and applying special effects) audio signals, and speakers for outputting sounds.

c. So3D Graphical Display, Avatar, and Physics Engine

The So3D engine is a three-dimensional visualization engine that controls the presentation of a respective view of a virtual area and objects in the virtual area on a display monitor. The So3D engine typically interfaces with a graphical user interface driver and the HID devices to present the views of the virtual area and to allow the communicant to control the operation of the HUD application.

In some embodiments, the So3D engine receives graphics rendering instructions from the area service. The So3D engine also may read a local communicant avatar database that contains images needed for rendering the communicant's avatar in the virtual area. Based on this information, the So3D engine generates a visual representation (i.e., an image) of the virtual area and the objects in the virtual area from the point of view (position and orientation) of the communicant's avatar in the virtual area. The visual representation typically is passes to the graphics rendering components of the operating system, which drive the graphics rendering hardware to render the visual representation of the virtual area on the client network node.

The communicant can control the presented view of the virtual area by inputting view control commands via a HID device (e.g., a computer mouse). The So3D engine updates the view of the virtual area in accordance with the view control commands. The So3D engine also updates the graphic representation of the virtual area on the display monitor in accordance with updated object position information received from the area service 26.

d. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

5. Client Node Architecture

A communicant typically connects to the network 18 from a client network node. The client network node typically is implemented by a general-purpose computer system or a dedicated communications computer system (or "console", such as a network-enabled video game console). The client network node executes communications processes that establish realtime data stream connections with other network nodes and typically executes visualization rendering processes that present a view of each virtual area entered by the communicant.

Figure 5:
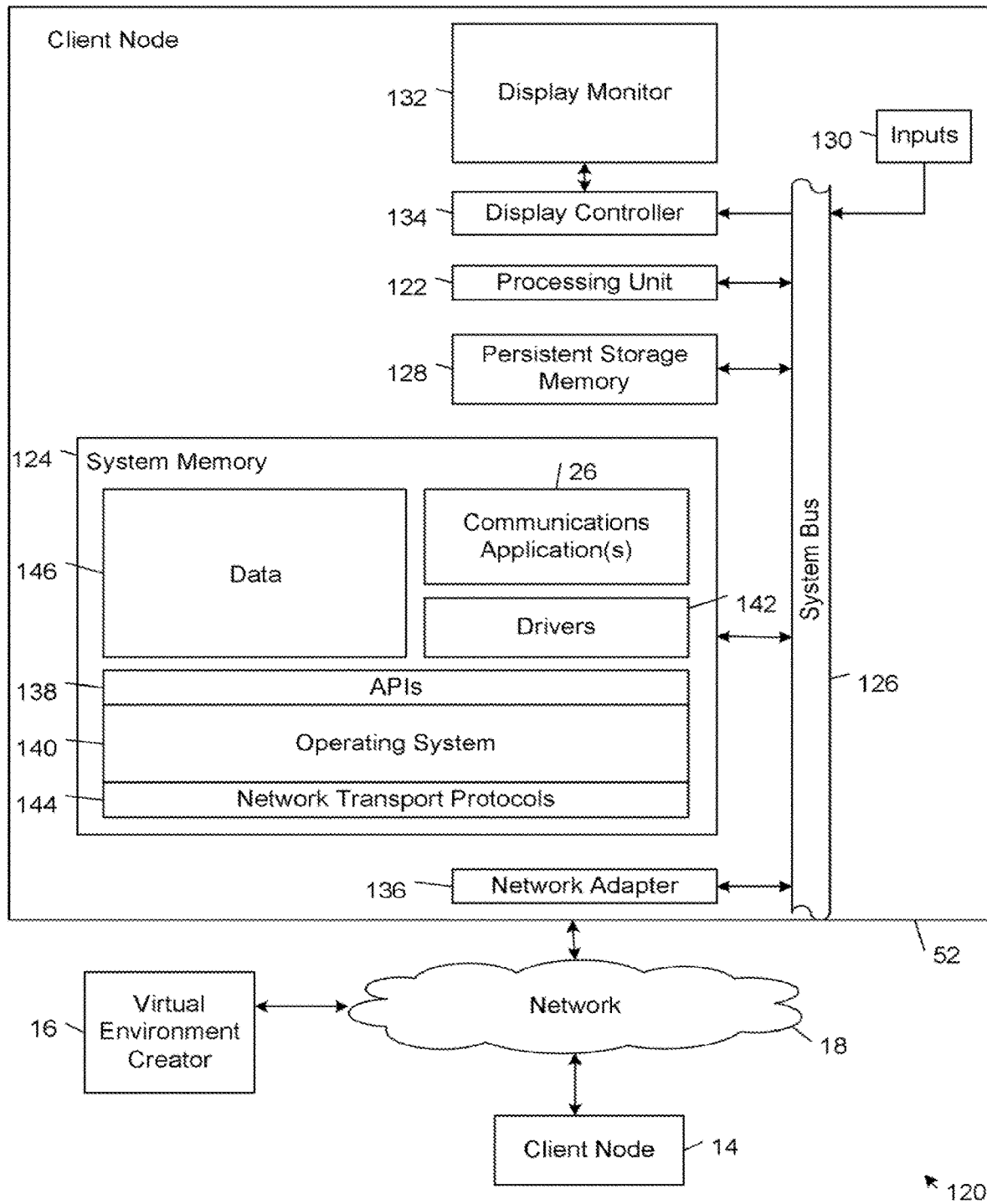
FIG. 5 is a block diagram of the network communication environment of FIG. 1 that shows components of an embodiment of a client network node.

FIG. 5 shows an embodiment of a client network node that is implemented by a computer system 120. The computer system 120 includes a processing unit 122, a system memory 124, and a system bus 126 that couples the processing unit 122 to the various components of the computer system 120. The processing unit 122 may include one or more data processors, each of which may be in the form of any one of various commercially available computer processors. The system memory 124 includes one or more computer-readable media that typically are associated with a software application addressing space that defines the addresses that are available to software applications. The system memory 124 may include a read only memory (ROM) that stores a basic input/output system (BIOS) that contains start-up routines for the computer system 120, and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A communicant may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware (e.g., peripheral output devices, such as speakers and a printer). The computer system 120 connects to other network nodes through a network adapter 136 (also referred to as a "network interface card" or NIC).

A number of program modules may be stored in the system memory 124, including application programming interfaces 138 (APIs), an operating system (OS) 140 (e.g., the Windows XP® operating system available from Microsoft Corporation of Redmond, Wash. U.S.A.), the communications application 26, drivers 142 (e.g., a GUI driver), network transport protocols 144, and data 146 (e.g., input data, output data, program data, a registry, and configuration settings).

6. Server Node Architecture

In some embodiments, the one or more server network nodes of the virtual environment creator 16 are implemented by respective general-purpose computer systems of the same type as the client network node 120, except that each server network node typically includes one or more server software applications.

In other embodiments, the one or more server network nodes of the virtual environment creator 16 are implemented by respective network devices that perform edge services (e.g., routing and switching).

C. Exemplary Communication Session

Referring back to FIG. 3, during a communication session, each of the client network nodes generates a respective set of realtime data streams (e.g., motion data streams, audio data streams, chat data streams, file transfer data streams, and video data streams). For example, each communicant manipulates one or more input devices (e.g., the computer mouse 52 and the keyboard 54) that generate motion data streams, which control the movement of his or her avatar in the virtual area 66. In addition, the communicant's voice and other sounds that are generated locally in the vicinity of the computer system 48 are captured by the microphone 60. The microphone 60 generates audio signals that are converted into realtime audio streams. Respective copies of the audio streams are transmitted to the other network nodes that are represented by avatars in the virtual area 66. The sounds that are generated locally at these other network nodes are converted into realtime audio signals and transmitted to the computer system 48. The computer system 48 converts the audio streams generated by the other network nodes into audio signals that are rendered by the speakers 56, 58. The motion data streams and audio streams may be transmitted from each of the communicant nodes to the other client network nodes either directly or indirectly. In some stream handling topologies, each of the client network nodes receives copies of the realtime data streams that are transmitted by the other client network nodes. In other stream handling topologies, one or more of the client network nodes receives one or more stream mixes that are derived from realtime data streams that are sourced (or originated) from other ones of the network nodes.

In some embodiments, the area service maintains global state information that includes a current specification of the virtual area, a current register of the objects that are in the virtual area, and a list of any stream mixes that currently are being generated by the network node hosting the area service. The objects register typically includes for each object in the virtual area a respective object identifier (e.g., a label that uniquely identifies the object), a connection handle (e.g., a URI, such as an IP address) that enables a network connection to be established with a network node that is associated with the object, and interface data that identifies the realtime data sources and sinks that are associated with the object (e.g., the sources and sinks of the network node that is associated with the object). The objects register also typically includes one or more optional role identifiers for each object; the role identifiers may be assigned explicitly to the objects by either the communicants or the area service, or may be inferred from other attributes of the objects or the user. In some embodiments, the objects register also includes the current position of each of the objects in the virtual area as determined by the area service from an analysis of the realtime motion data streams received from the network nodes associated with objects in the virtual area. In this regard, the area service receives realtime motion data streams from the network nodes associated with objects in the virtual area, tracks the communicants' avatars and other objects that enter, leave, and move around in the virtual area based on the motion data. The area service updates the objects register in accordance with the current locations of the tracked objects.

In the process of administering realtime data stream connections with other network nodes, the area service maintains for each of the client network nodes a set of configuration data, including interface data, a zone list, and the positions of the objects that currently are in the virtual area. The interface data includes for each object associated with each of the client network nodes a respective list of all the sources and sinks of realtime data stream types that are associated with the object. The zone list is a register of all the zones in the virtual area that currently are occupied by the avatar associated with the corresponding client network node. When a communicant first enters a virtual area, the area service typically initializes the current object positions database with position initialization information. Thereafter, the area service updates the current object positions database with the current positions of the objects in the virtual area as determined from an analysis of the realtime motion data streams received from the other client network nodes sharing the virtual area.

IV. Managing Interactions in a Network Communications Environment

A. Introduction

The network infrastructure service environment 30 manages communicant interactions with each other and with the virtual areas of the virtual environment created by the virtual environment creator 16 based on explicit attribute values that are declared by communicants and inferred attribute values that are derived by the interaction service from statistical analyses of the results of queries on the relationship database 36.

B. Inferring Attribute Values

Among the exemplary types of attribute values that may be inferred from the query results are relationship attribute values and trust level attribute values. Relationship attribute values include social network ties, relationship type values that specify the type of a social network tie, and relationship level values that specify a degree, strength, or rating that is associated with a social network tie or a relationship type. A trust level attribute value specifies a level of trust that is associated either with the user as a whole (in which case the trust level typically is associated with one or more of the user's declarations) or with one or more individual declarations that are asserted by the user in connection with his or her interactions in the network communications environment 10.

1. Inferring Relationship Attribute Values a. Introduction

The interaction service typically infers relationship attribute values based on one or more interaction parameters that summarize or otherwise describe aspects of the individual or collective interactions between communicants. An exemplary set of interaction parameters include: the degree of overlap of their interactions; the type of interaction; the recentness of interaction; the frequency of interaction; and the place of interaction (i.e., the virtual area in which the interaction occurred).

Degree of Interaction Overlap

The degree of interaction overlap refers to the degree to which the communicants' interactions overlap in time or in virtual space.

Type of Interaction

The interaction type attribute values correspond to class labels that are selected from an interaction type taxonomy. In one exemplary embodiment, an interaction type taxonomy includes the following classes: realtime audio interaction; realtime video interaction; avatar interaction; file share interaction; text chat interaction; electronic mail interaction. Each interaction type class is assigned a respective weight, which typically is determined empirically.

Recentness of Interaction

The recentness of interaction takes into account the recentness of the communicants' interactions with one another.

Frequency of Interaction

The frequency of interaction takes into account the frequency with which the communicants interact with one another.

Place of Interaction

The place of interaction takes into account the virtual areas in which the communicants interaction with one another. Each virtual area typically is associated with a respective set of one or more place attribute values. In some embodiments, the place attribute values include place name attribute values and place type attribute values, which oftentimes describe properties or aspects of a virtual area that influence how communicants perceive the virtual area or how communicants relate to the virtual area. For example, the place name attribute values typically label virtual areas with descriptive labels (e.g., Linda's Home, XYZ Corp, Tim's Dorm Room, Fred's Lounge, etc.). In some embodiments, the place type attribute values correspond to respective class labels that are selected from a place type taxonomy. The classes in an exemplary embodiment of a place type taxonomy include: home; work; library; public place; private place; open place; closed place; socially warm place; socially cold place; an attractive place; an unattractive place. Each communicant may be associated with a separate set of place attribute values for each virtual area that he or she visits. These place attribute values may be explicitly declared by the communicant or they may be inferred from the communicant's interactions in the virtual area. Each place type class is assigned a respective weight, which typically is determined empirically.

In some embodiments, one or more of these interaction parameters are used to calculate one or more scores from data that is contained in the results of the queries on the relationship database 36. Relationship attribute values then may be inferred from these scores. For example, in some embodiments, the scores are applied to a relationship attribute predicate that conditions the determination of one or more relationship attribute values on the score values. Among the exemplary types of relationship attribute values that may be inferred from interaction parameter values are social network ties, relationship type attribute values, and relationship level attribute values. The determination and use of these relationship attribute values are described in the following sections.

b. Inferring Social Network Ties

In some embodiments, the interaction service infers that a social network tie exists between a pair of communicants in response to a determination that the communicants know or have reason to one another based on their interactions in the network communication environment 10. These interactions can include both concurrent interactions (e.g., exchanging realtime data streams, and sharing or concurrently viewing the same realtime data streams) and non-concurrent interactions (e.g., exchanging electronic mail messages, asynchronously sharing or viewing the same files or multimedia content, and visiting the same virtual area at different times).

The interaction service typically infers the existence of a social network tie between a pair of communicants based on one or more of the interaction parameters described above in section IV.B.1.a. In this process, the interaction service computes one or more scores from one or more of the interaction parameters that are derived from a statistical analysis of the results of queries on the relationship database 36. The interaction service typically applies the one or more scores to a relationship tie predicate, which conditions the determination of the existence of a relationship tie on satisfaction of respective stipulations (also referred to as "conditions") on the score values. In some embodiments, for each of the interactions returned in the search results the interaction service computes a respective interaction score from one or more of the interaction parameters. The interaction service derives a relationship tie score from the interaction scores, and creates a social network tie between the communicants only if the relationship tie score satisfies a specified threshold.

In the relationship tie score calculation process, the interaction overlap parameter values typically influence the corresponding interaction scores by amounts that increase with increasing interaction overlap parameter value; the interaction type parameter values typically influence the corresponding interaction scores by respective type-dependent amounts; the recentness parameter values typically influence the interaction scores by respective amounts that decreases with the age of the corresponding interaction (e.g., the interaction time subtracted from the current time); and the frequency of interaction parameter values typically influence the relationship tie scores in a way that increases with the frequency with which the communicants interact with one another. In some of these embodiments, a final interaction score is determined for each interaction between the communicants by multiplying the interaction overlap score, the interaction type score, and the interaction recentness score, and then summing (and optionally normalizing) the final interaction scores to produce a relationship tie score. In these embodiments, the network infrastructure service environment 30 determines whether or not to create a social network tie between the communicants based on a comparison of the relationship tie score to an empirically determined threshold.

c. Inferring Relationship Type Attribute Values

In some embodiments, the network infrastructure service 30 infers a relationship type attribute value for a social network tie from a statistical analysis of the results of queries on the relationship database 36. Each relationship type attribute value specifies a type of a social network tie. Exemplary relationship types include a kinship type (e.g., father-of, cousin-of), an affective type (e.g., respects, likes), a cognitive type (e.g., knows, friends-with, acquaintance-of), and social role type (e.g., teacher-of, works-with).

Figure 6A:
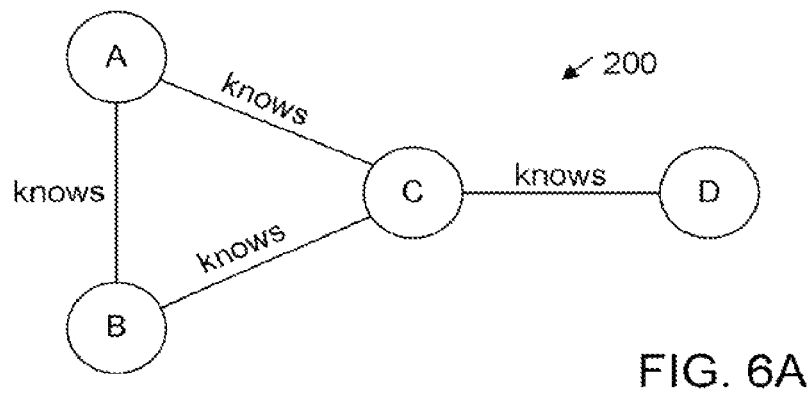
FIG. 6A is an embodiment of a social network diagram showing a map of ties between a set of nodes.
Figure 6B:
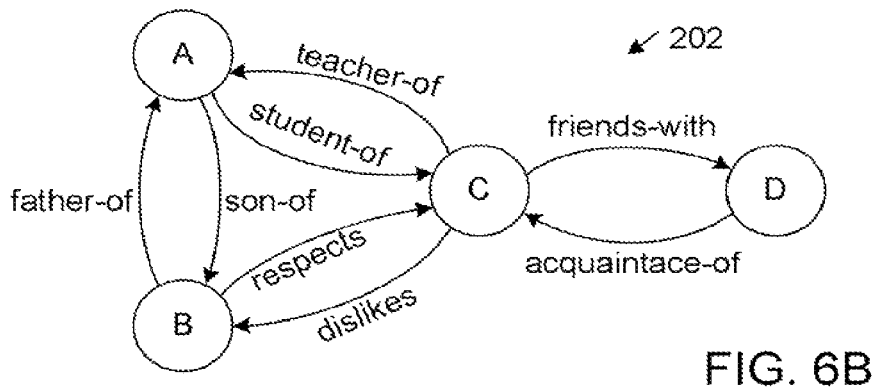
FIG. 6B is an embodiment of a social network diagram showing a map of ties between a set of nodes.
Figure 6C:
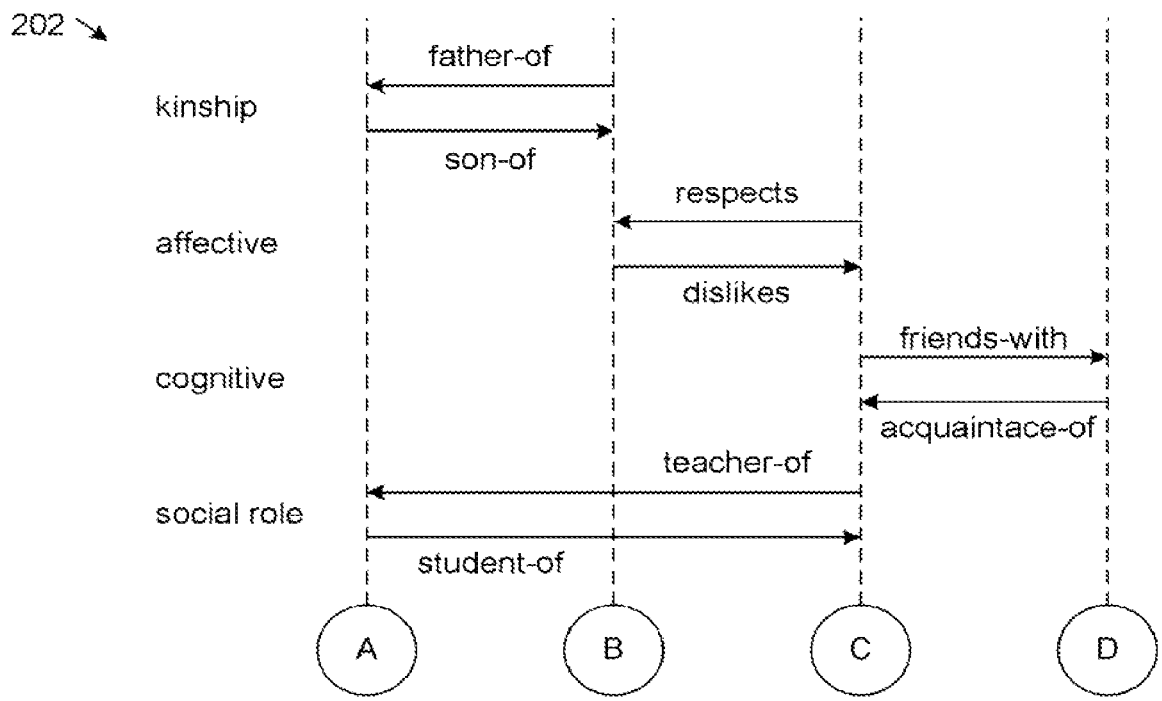
FIG. 6C is an embodiment of a social network diagram that presents an alternative view of the mapping between the nodes of the social network diagram shown in FIG. 6B.

Each tie between a pair of the nodes a social network may be associated with one or more relationship type values. FIG. 6A shows an embodiment of a social network diagram 200 that represents communicants as nodes (also referred to as "vertices"), which are labeled A, B, C, D, and their mutual relationships as undirected ties or edges that connect one node to another, where each tie corresponds to the cognitive "knows" type of relationship. In this embodiment, communicants A, B, C respectively know each other, whereas node D only knows node C. FIGS. 6B and 6C show an embodiment 202 of the social network diagram 200 in which the relationships between the communicants A, B, C, D are represented as directed ties of different types. For example, communicants A and B are related by the kinship types of "son-of" and "father-of", respectively; communicants A and C are related by the role types of "student-of" and "teacher-of", respectively; communicants B and C are related by the affective types of "dislikes" and "respects", respectively; and communicants C and D are related by the cognitive types of "friends-with" and "acquaintance-of", respectively.

The interaction service may infer relationship type attribute values for social network ties in a variety of different ways. In some embodiments, each relationship type is associated with a respective taxonomy that includes a respective set of one or more class labels. Each of the relationship type class labels is associated with a respective classification predicate that must be satisfied before the interaction service associates the relationship class label with a social network tie. The classification predicate typically is defined by a threshold on a classification score that is calculated from a heuristic (e.g., weighted) combination of variables whose values are determined from the results of queries on the relationship database 36. At least some of the variables measure the influence of respective ones of the interaction parameters (which are described above in section IV.B.1.a) on the likelihood that a respective interaction between a pair of communicants evidences a communicant relationship that corresponds to the associated class label.

As an example of the analysis described in the preceding paragraph, a relationship type taxonomy includes a "parent" class label and a "child" class label. Each of these labels is associated with a respective weighted combination of variables that measure the influence of the various interaction parameters on the likelihood that the interactions between a pair of communicants evidence a parent-child relationship. Among these considerations are the degree of overlap of the communicants' interactions, the types of their interactions, the recentness of their interactions, the frequency of their interactions, and the places of their interactions. In one exemplary embodiment, interactions that occur in places that typically are associated traditional family relationships (e.g., home) increase the likelihood that a parent-child relationship exists, whereas interactions that occur in places that typically are not associated with traditional family relationships (e.g., school, work, or karate class) decrease the likelihood that a parent-child relationship exists. Similarly, types of interaction that typically are associated with parent-child relationships (e.g., viewing or sharing home movies or pictures) increase the likelihood that a parent-child relationship exists, whereas types of interactions that typically are not associated with traditional family relationships (e.g., viewing or sharing work files) decrease the likelihood that a parent-child relationship exists. In addition, interaction overlap, interaction frequency, and interaction recentness tend to be correlated with parent-child relationships; therefore, higher values for these considerations increase the likelihood that a parent or child relationship exists, whereas lower values for these considerations decrease the likelihood that a parent-child relationship exist. In some embodiments, the places of interaction and the types of interaction parameter values are accorded higher weights than the degree of interaction, the recentness of interaction, and the frequency of interaction parameter values because the places of interaction and types of interaction intuitively appear to provide higher predictive reliability.

In some embodiments, the interaction service additionally may infer the particular role (i.e., parent or child) that is performed by the individual communicants based on attributes that are associated with the communicants. For example, if the interaction service has inferred that a parent-child relationship exists, the interaction service may automatically infer that the communicant who is associated with the older age attribute value is the parent and the other communicant is the child.

The interaction service may perform analyses analogous to the one described in the preceding paragraph for other defined relationship types.

d. Inferring Relationship Level Attribute Values

In some embodiments, the network infrastructure service 30 infers a relationship level attribute value for a social network tie from a statistical analysis of the results of queries on the relationship database 36. Each relationship level attribute value specifies a level of relationship between the user and another communicant. A separate relationship level may be derived for each relationship type that is associated with a social network tie between a pair of communicants.

Figure 7:
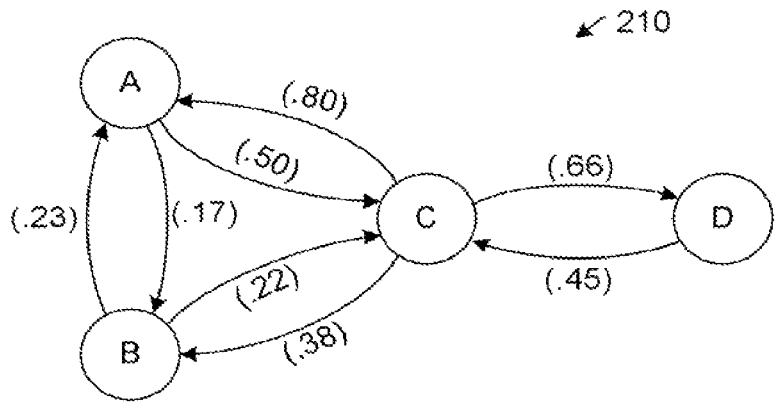
FIG. 7 is an embodiment of a social network diagram showing a map of ties between a set of nodes.

In some embodiments, the relationship level attribute value may correspond to a numerical value that is normalized to a particular scale (e.g., a number between zero and one). For example, FIG. 7 shows an embodiment 210 of the social network diagram 200 (see FIG. 6A) in which each of the directed "knows" relationships between the communicants is associated with a respective relationship level attribute value that models how well one communicant knows another communicant. As shown by the social network diagram 202, the level at which a pair of communicants know each other need not be (and typically is not) the same. For example, in the social network diagram 202 communicant A knows communicant B at a level of 0.23, whereas communicant B knows communicant A at a level of 0.17.

The relationship level attribute values typically are normalized to a particular range. For example, in the embodiment shown in FIG. 7, the relationship level attribute values are normalized to a range of [0,1]. In other embodiments, each relationship level attribute value corresponds to a class label that is selected from a relationship level taxonomy (e.g., a level of "friendship" taxonomy, such as: best friends, good friends, friends, acquaintances, hasn't met).

The interaction service may infer relationship level attribute values for social network ties in a variety of different ways. In some embodiments, the interaction service infers a relationship level value for a social network tie between a pair of communicants based on a statistical analysis of the results of queries on the relationship database 36. In some embodiments, the interaction service calculates the relationship levels from a heuristic (e.g., weighted) combination of variables the values of which are determined from the results of queries on the relationship database 36. Typically, at least some of the variables measure the influence of respective ones of the interaction parameters (which are described above in section IV.B.1.a) on the social strength of interactions between the pair of communicants. Among these interaction parameters are the degree of overlap of the communicants' interactions, the types of their interactions, the recentness of their interactions, the frequency of their interactions, and the places of their interactions.

In some embodiments, the interaction service calculates a respective interaction strength value for each of the interactions that is returned in the search results based on one or more of the interaction parameters described above, derives a relationship level attribute value from the interaction strength values, and assigns the relationship level attribute value to the social network tie between the pair of communicants. In the calculation process, the interaction overlap parameter values typically influence the corresponding interaction strength values by an amount that increases with the degree of overlap; the interaction type parameter values typically influence the corresponding interaction strength values by a type-dependent amount; the interaction recentness parameter values typically influence the interaction strength values by an amount that decreases with the age of the corresponding interaction (e.g., the interaction time subtracted from the current time); and the frequency of interaction parameter values typically influence the relationship level attribute values in a way that increases with the frequency with which the communicants interact with one another. In some embodiments, the relationship level attribute value corresponds to a statistic (e.g., arithmetic mean, median, mode, interquartile mean) that summarizes the distribution of interaction strength scores.

2. Inferring Trust Attribute Values

In some embodiments, the interaction service infers a trust level attribute value that specifies a level of trust that is associated either with a user as a whole or with one or more individual declarations that are asserted by the user in connection with the user's interactions in the network communications environment 10. The trust level attribute value may correspond to a numerical value that is normalized to a particular scale (e.g., a number between zero and one, or an integer number of stars in a five star rating taxonomy) or it may correspond to a class label that is selected from a trust level taxonomy (e.g., very trustworthy, trustworthy, untrustworthy, very untrustworthy).

The interaction service may infer trust level attribute values in a variety of different ways. In some embodiments, the interaction service infers a trust level value for a communicant based on a statistical analysis of the results of queries on the relationship database 36. In some embodiments, the interaction service calculates the trust levels from a weighted combination of variables whose values are determined from the results of queries on the relationship database 36 based on one or more interaction parameters, including the degree of overlap of the communicants' interactions, the types of their interactions, the recentness of their interactions, the frequency of their interactions, and the places of their interactions.

In some embodiments, the interaction service infers a trust level for the user as a whole based on the social network ties that connect the user with other communicants. In some of these embodiments, the trust level corresponds to a social ranking of the user that is derived from the number of social network ties connecting other communicants to the user (i.e., backward ties), the relationship levels that are associated with those ties, and the trust levels that are assigned to the other communicants. In some of these embodiments, the derived trust level increases with the number of backward ties that connect other communicants to the user, where the contribution of each of the backward ties typically is weighted by one or more of the following factors: a factor that increases with the relationship level associated with the backward tie; a factor that increases with the trust level assigned to the other communicant connected to the user by the backward tie; and a factor that decreases with the number of forward ties emanating from the other communicant. In one exemplary embodiment, the contribution of each backward tie is weighted by all three of these factors, as follows:

$$T(u) = \alpha \sum_{o \in \theta} \frac{T(o) \cdot L(o, u)}{N_o} \quad (1)$$

where $T(u)$ is the trust level of the communicant u, $L(o,u)$ is the relationship level for a social network tie (or relationship type) from o to u, $N_o$ is the number of forward social network ties emanating from communicant o, and $\theta$ is the set of communicants that have forward social network ties with the user u. The interaction service typically determines trust levels for all communicants iteratively, and then sets the normalization parameter a to a value that normalizes the trust levels such that the total trust level is constant.

In some embodiments, the trust level inferred for the user as a whole is assigned to each of the individual declarations that are asserted by the user in connection with the user's interactions in the network communications environment 10.

In other embodiments, the interaction service infers a respective trust level for one or more individual declarations that are asserted by the user in connection with the user's interactions in the network communications environment 10 based on a heuristic (e.g., weighted) combination of variables the values of which are determined from the results of queries on the relationship database 36. In some of these embodiments, the variables may measure for each declaration one or more of the following interaction parameters: the number of interactions in which the declaration was asserted, the length of time over which the user has asserted the declaration, and the number of ties established while asserting the declaration. Generally, the trust level increases with a respective increase in the value of each of these parameters. In other ones of these embodiments, one or more of the variables measure the likelihood that the user's interactions are consistent with the asserted declarations. For example, for each declaration that is asserted by the user, the interaction service may calculate a respective consistency score for each interaction record that is returned in the search results; the interaction service then may calculate a final trust level for the declaration based on the consistency scores. The respective consistency scores typically are calculated based on one or more considerations, including how well the interaction comports with the declaration. For example, if the user asserts that he is seven years old, interactions that take place in a virtual elementary school space will have a higher consistency score than interactions that take place in a virtual casino space. In some embodiments, the consistency scores are weighted by an amount that increases with the social interaction strength (discussed above) that is associated with the interaction. The interaction service determines the trust level of a declaration based on a statistical analysis of the consistency scores. In some embodiments, the trust level corresponds to a metric that combines: a statistic (e.g., mean, median, mode) that summarizes the distribution of consistency scores; a measure of the number of interactions that involved the declaration; and the length of time the declaration has been asserted by the user.

C. Compiling Social Network Profiles

The attribute values that are inferred from the query results may be used to create new identity attribute values or new relationship attribute values in the user's social network profile 40. The inferred attributed values also may be used to modify or complement any explicit identity or relationship attribute values in the user's social network profile 40. In some embodiments, the interaction service may dynamically modify one of the explicit relationship type attribute values that the user has declared for a social network tie based on an inferred attribute value that is different from the declaration attribute value, suggesting that the nature of relationship has changed. For example, in a case in which the user has explicitly declared that he or she has a social network tie with another communicant but the user has not declared any relationship level, the interaction service may assign a relationship level attribute value to the explicit social network tie based on an inferred relationship level attribute value. In other cases, the interaction service may infer that a new relationship tie exists between the user and another communicant even though the user has not explicitly declared that such a relationship exists; the new relationship tie may be, for example, an original relationship tie between unconnected communicants or it may be a new type of relationship tie between communicants that already are connected by one or more other types of relationship ties. The interaction service also may infer from the query results a relationship type attribute value and a relationship level attribute value for the inferred relationship tie. The interaction service additionally may associate an inferred trust level with the user as a whole; the interaction service also may associate inferred trust level attribute values with respective ones of the identity declarations (e.g., name, age, gender, profession, geographic location) in the user's social network profile 40.

D. Managing Communicant Interactions

In some embodiments, the network infrastructure service environment 30 manages communicant interactions with each other based on at least one of the attribute values.

In some embodiments, for example, the rendezvous service manages direct and indirect interactions involving communicants via communicant privacy preferences (which typically are stored in the social network profiles 40). In these embodiments, when a user commands his or her client node to access information (e.g., connection handle, presence information, personal profile information) relating to a target communicant, the client node authenticates the user to the rendezvous service with a token received from the security service. After the user has been authenticated, the client node establishes a session with the rendezvous service. The client node then transmits to the rendezvous service a request for the desired information relating to the target communicant. The request typically identifies the target communicant with a target identifier or a set of one or more attributes. The rendezvous service identifies the target communicant by querying the presence database for either the target communicant corresponding to the target identifier or the target communicant having attribute values that match the designated attribute values. Based on the query, the rendezvous service retrieves the state and capability requirements of the target communicant from the relationship database. The rendezvous service compares the capabilities of the user (including the types and levels of any relationship ties between the user and the target communicant, and/or the trust level associated with the user) with the capability requirements associated with the target communicant. If the capability requirements are satisfied, the rendezvous service transmits the requested information to the requesting client node.

In this way, the rendezvous service is able to restrict which communicants can access resources (e.g., connection handle, personal profile information, and presence information) that are associated with another communicant. Thus, in some embodiments, the rendezvous service can restrict which communicants can contact the user. For example, only those communicants who have an explicit tie or an inferred tie with the user may contact the user. In some exemplary embodiments, the rendezvous service filters messages (e.g., electronic mail messages, chat messages, whisper messages) sent to the user based on the one or more attribute values. In these embodiments, the rendezvous service may sort the messages into folders, prioritize the messages, or block ones of the messages based on, for example, the relationship type and/or relationship level between the user and the senders, and/or based on the trust level associated with the senders.

In some embodiments, the area service manages communicant interactions with virtual areas via governance rules (which typically are associated with the virtual areas). In these embodiments, when a user commands his or her client node to access information relating to a virtual area (e.g., state information, or information needed to enter the area). The client node authenticates the user to the area service with a token received from the security service. After the user has been authenticated, the client node establishes a session with the area service. The client node then transmits to the area service 46 a request to connect to an instance of the virtual area. If the user's capabilities (including the trust level associated with the user) satisfy the capability requirements associated with the virtual area instance, the area service returns configuration data to the client node. The configuration data typically includes a definition of the virtual area instance and a register of the objects currently in the virtual area instance. At this point, the client node can display the current state of the virtual area in the HUD, and the user can direct the client node to request entry in the virtual area.

In this way, the area service is able to restrict which communicants can enter a virtual area based on an inferred attribute value (e.g., an inferred trust level attribute value) that is associated with the user or with one or more of the elements of the user's social network profile. For example, in some embodiments, only those communicants who are associated with an age declaration that is above a specified age threshold and has an inferred trust level above a specified confidence level may enter an adult entertainment virtual area. In some embodiments, the area service restricts which virtual areas of the virtual environment are visible to the communicants based on the respective inferred trust levels that are associated with the communicants or their respective identity assertions. For example, in some of these embodiments, the area service prevents communicants who are associated with age declarations that are above specified age thresholds but are associated with an inferred trust level below a specified confidence level to perceive the existence of virtual areas (e.g., an adult entertainment virtual area) that are associated with the age thresholds. In these embodiments, the area service effectively removes those virtual areas from the virtual environment that is presented to those communicants who do not satisfy the age requirements with sufficient confidence.

E. Exemplary Embodiments

1. First Exemplary Embodiment a. Introduction

Figure 8:
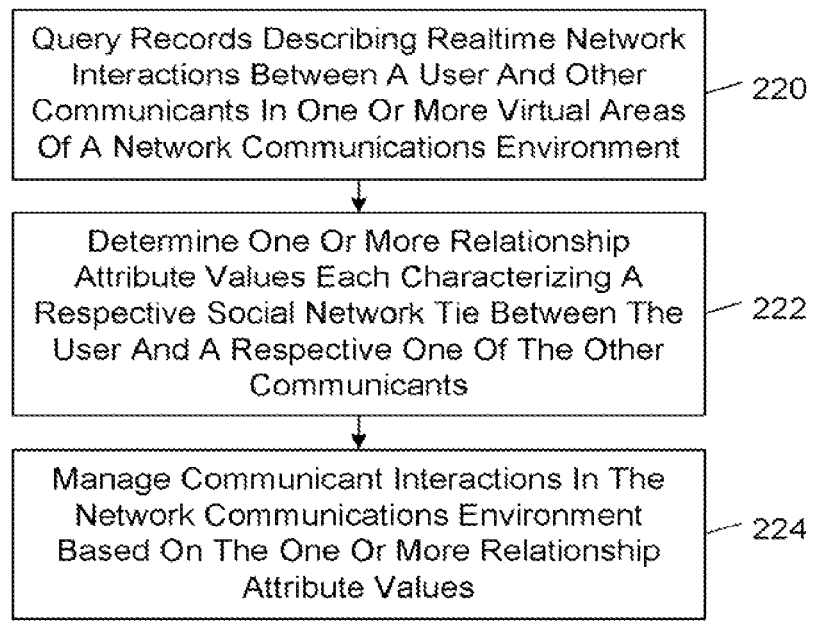
FIG. 8 is a flow diagram of an embodiment of an interaction management method.

FIG. 8 shows a first exemplary embodiment of a method by which the network infrastructure service environment 30 manages communicant interactions with each other and with the virtual areas of the virtual environment created by the virtual environment creator 16 based on results of queries on the relationship database 36.

In accordance with the method of FIG. 8, the network infrastructure service environment 30, queries records describing realtime network interactions between a user and other communicants in one or more virtual areas of a network communications environment (FIG. 8, block 220).

The network infrastructure service environment 30 determines one or more relationship attribute values each characterizing a respective social network tie between the user and a respective one of the other communicants (FIG. 8, block 222). In this process, the network infrastructure service environment 30 derives the one or more relationship attribute values based on (i) a statistical analysis of results of the querying describing concurrent interactions between the user and one or more of the other communicants in at least one of the virtual areas and (ii) one or more place attribute values characterizing the at least one virtual area in which the concurrent interactions occurred. The one or more relationship attribute values typically are stored in a computer-readable medium.

The network infrastructure service environment 30 manages communicant interactions in the network communications environment based on the one or more relationship attribute values (FIG. 8, block 224). In this process, the network infrastructure service environment 30 typically receives a first network communication from a network node at which one of the user and the other communicants is operating. The first network communication includes a request for an interaction in the network communications environment (e.g., a request to communicate with another communicant, a request to enter a virtual area, and a request to access a resource). The network infrastructure service environment 30 typically transmits a second network communication enabling the requested interaction in response to satisfaction of a condition dependent at least in part on the one or more relationship attribute values.

b. Determining Relationship Attribute Values

In general, the network infrastructure service 30 may determine the relationship attribute values (FIG. 8, block 222) in accordance with any of the embodiments that are described in the present specification or any combination of such embodiments.

In some embodiments, the network infrastructure service environment 30 derives the one or more relationship attribute values based on one or more place attribute values characterizing how the user relates to the at least one virtual area in which the concurrent interactions occurred.

In some embodiments, based on the querying, the network infrastructure service environment 30 ascertains a relationship type attribute value that specifies a type of the social network tie between the user and the respective communicant. In this process, the network infrastructure service environment 30 may determine a relationship type attribute value declaring that the user knows the respective communicant.

In some embodiments, based on the querying, the network infrastructure service environment 30 ascertains a relationship level attribute value that specifies a level of relationship that the user has with the respective communicant. In this process, the network infrastructure service environment 30 may determine the relationship level attribute value based on at least one attribute value respectively characterizing the at least one area in which the respective concurrent interactions occurred. The network infrastructure service environment 30 may ascertain the relationship level based on at least one attribute value respectively characterizing how the user relates to the at least one virtual area in which the respective concurrent interactions occurred. The relationship level attribute value may be used to determine whether or not to grant the respective communicant access to one or more resources that are associated with the user, or to filter messages that are sent from the respective communicant to the user.

In some embodiments, based on the results of the querying, the network infrastructure service environment 30 ascertains a trust level attribute value that specifies a level of trust. In some cases, the trust level attribute value is assigned to the user as a whole. In these cases, the network infrastructure service environment 30 may ascertain the trust level attribute value from a count of social network ties connecting other communicants to the user, respective relationship levels that are associated with those ties, and trust levels that are assigned to respective ones of the other communicants. In some cases, the trust level attribute value is assigned to one or more declarations asserted by the user in connection with the user's interactions in the network communications environment. In these cases, the network infrastructure service environment 30 may ascertain the trust level attribute value based on one of more of the following considerations: how long the one or more declarations have been asserted in connection with the user's interactions in the network communications environment; how many of the user's interactions in the network communications environment occurred while the user was associated with the one or more declarations; and respective likelihoods that the user's interactions are consistent with the asserted declarations. The one or more trust level values may be used to verify that at least one of the one or more declarations meets an access restriction predicate before granting the user access to a resource available through the network communications environment. In some of these embodiments, at least one trust recommendation may be provided to the one or more other communicants based on the trust level attribute value.

c. Managing User Interactions

In general, the network infrastructure service 30 may manage communicant interactions (FIG. 8, block 224) in accordance with any of the embodiments that are described in the present specification or any combination of such embodiments.

In some embodiments, the network infrastructure service environment 30 may control the user's access to a resource (e.g., a virtual area, a communication connection with one of the other communicants, and information characterizing one of the other communicants) that is available through the network communications environment based on at least one of the relationship attribute values. In this process, the network infrastructure service environment 30 typically determines whether at least one access control predicate associated with the resource is satisfied based on the one or more relationship attribute values. The network infrastructure service 30 typically provides at least one of the user and other communicants access to the resource in response to a determination that the at least one access control predicate is satisfied. In the process of providing access, the network infrastructure service 30 typically transmits to each of the at least one of the user and the other communicants a respective communication enabling access to the resource. For example, the network infrastructure service 30 may transmit a connection handle of one of the user and the other communicants in the respective network communication, or the network infrastructure service environment 30 may transmit in the respective network communication information enabling rendering of a virtual area in its current state on a respective node at which the at least one of the user and the other communicants are operating.

In some embodiments, the network infrastructure service environment 30 compiles a social network profile that is associated with the user from the relationship attribute values and explicit relationship data provided by at least one of the user and the other communicants. In this process, the explicit relationship data may be modified based on results of the querying.

2. Second Exemplary Embodiment

Figure 9:
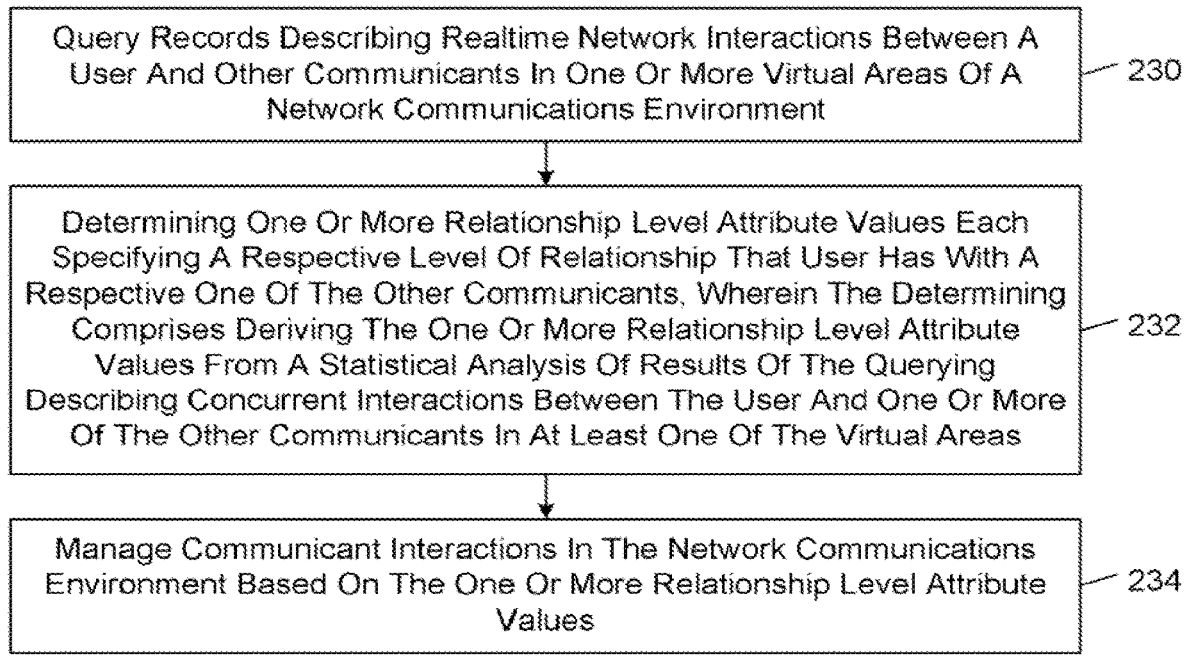
FIG. 9 is a flow diagram of an embodiment of an interaction management method.

FIG. 9 shows a second exemplary embodiment of a method by which the network infrastructure service environment 30 manages communicant interactions with each other and with the virtual areas of the virtual environment created by the virtual environment creator 16 based on results of queries on the relationship database 36.

In accordance with the method of FIG. 9, the network infrastructure service environment 30, queries records describing realtime network interactions between a user and other communicants in one or more virtual areas of a network communications environment (FIG. 9, block 230).

The network infrastructure service environment 30 determines one or more relationship level attribute values each specifying a respective level of relationship that user has with a respective one of the other communicants (FIG. 9, block 232). In this process, the network infrastructure service environment 30 derives the one or more relationship level attribute values from a statistical analysis of results of the querying describing concurrent interactions between the user and one or more of the other communicants in at least one of the virtual areas. In general, the network infrastructure service 30 may determine the relationship attribute values in accordance with any of the embodiments that are described in the present specification or any combination of such embodiments. In some cases, the network infrastructure service environment 30 ascertains the relationship level based on at least one attribute value respectively characterizing how the user relates to the at least one virtual area in which the respective concurrent interactions occurred. The network infrastructure service environment typically stores the one or more relationship level attribute values in a computer-readable medium.

The network infrastructure service environment 30 manages communicant interactions in the network communications environment based on the one or more relationship level attribute values (FIG. 9, block 234). In general, the network infrastructure service 30 may manage communicant interactions in accordance with any of the embodiments that are described in the present specification or any combination of such embodiments. In some embodiments, the network infrastructure service environment 30 receives from a network node at which one of the user and the other communicants is operating a first network communication comprising a request for an interaction in the network communications environment, and transmits a second network communication enabling the requested interaction in response to satisfaction of a condition dependent at least in part on the one or more relationship level attribute values. In some embodiments, the network infrastructure service environment 30 determines whether at least one access control predicate associated with the resource is satisfied based on the one or more relationship level attribute values. The network infrastructure service environment 30 typically provides at least one of the user and other communicants access to the resource in response to a determination that the at least one access control predicate is satisfied.

3. Third Exemplary Embodiment a. Introduction

Figure 10:
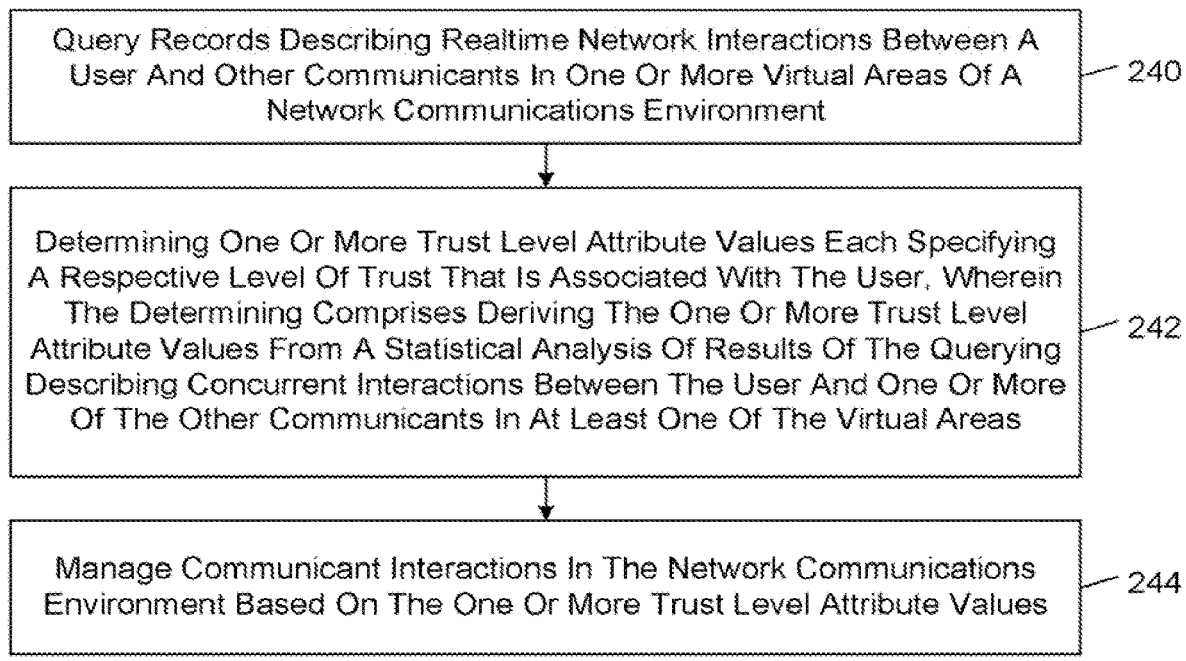
FIG. 10 is a flow diagram of an embodiment of an interaction management method.

FIG. 10 shows a third exemplary embodiment of a method by which the network infrastructure service environment 30 manages communicant interactions with each other and with the virtual areas of the virtual environment created by the virtual environment creator 16 based on results of queries on the relationship database 36.

In accordance with the method of FIG. 10, the network infrastructure service environment 30 queries records describing realtime network interactions between a user and other communicants in one or more virtual areas of a network communications environment (FIG. 10, block 240).

The network infrastructure service environment 30 determines one or more trust level attribute values each specifying a respective level of trust that is associated with the user (FIG. 10, block 242). In this process, the network infrastructure service environment 30 derives the one or more trust level attribute values from a statistical analysis of results of the querying describing concurrent interactions between the user and one or more of the other communicants in at least one of the virtual areas. The network infrastructure service environment 30 typically stores the one or more relationship attribute values in a computer-readable medium.

The network infrastructure service environment 30 manages communicant interactions in the network communications environment based on the one or more trust level attribute values (FIG. 10, block 244).

b. Determining Relationship Attribute Values

In general, the network infrastructure service 30 may determine the relationship attribute values (FIG. 10, block 242) in accordance with any of the embodiments that are described in the present specification or any combination of such embodiments.

In some embodiments, the network infrastructure service environment 30 assigns a given one of the one or more trust level attribute values to the user as a whole. In these embodiments, the network infrastructure service environment 30 may ascertain the given trust level attribute value from a count of social network ties connecting other communicants to the user, respective relationship levels that are associated with those ties, and trust levels that are assigned to respective ones of the other communicants.

In some embodiments, the network infrastructure service environment 30 assigns the trust level attribute value to one or more declarations asserted by the user in connection with the user's interactions in the network communications environment. In these embodiments, the network infrastructure service environment 30 may ascertain each of the one or more trust level attribute values based on one or more of the following considerations: how long the one or more declarations have been asserted in connection with the user's interactions in the network communications environment; how many of the user's interactions in the network communications environment occurred while the user was associated with a respective one of the one or more declarations; and respective likelihoods that the user's interactions are consistent with the asserted declarations.

c. Managing User Interactions

In general, the network infrastructure service 30 may manage user interactions (FIG. 10, block 244) in accordance with any of the embodiments that are described in the present specification or any combination of such embodiments.

In some embodiments, the network infrastructure service environment 30 receives from a network node at which one of the user and the other communicants is operating a first network communication comprising a request for an interaction in the network communications environment. The network infrastructure service environment 30 typically transmits a second network communication enabling the requested interaction in response to satisfaction of a condition dependent at least in part on the one or more trust level attribute values. In some embodiments, the network infrastructure service environment 40 determines whether at least one access control predicate associated with the resource is satisfied based on the one or more trust level attribute values, and provides at least one of the user and other communicants access to the resource in response to a determination that the at least one access control predicate is satisfied. In some embodiments, the network infrastructure service environment 30 may provide at least one trust recommendation to the one or more other communicants based on the one or more trust level attribute values.

V. Conclusion

The embodiments that are described herein provide a network communications environment with advanced interaction management functionality. Some embodiments infer the existence of social network ties and relationship attribute values from realtime communicant interactions in the network communications environment. In this way, these embodiments enable the opportunities for users to interact with one another to be expanded beyond the opportunities that exist with closed interaction management approaches while still providing reasonable privacy and security protections that are not available with open interaction management approaches. Some embodiments infer from realtime interactions between communicants in one or more virtual areas trust levels that are used to: manage communicant interactions with each other and with virtual areas; and provide trust recommendations to communicants for the purpose of encouraging the proliferation of trust-based interactions.

Other embodiments are within the scope of the claims.

The invention claimed is:

1. A computer-implemented method performed by one or more processors, the method comprising:
inferring one or more relationship attribute values characterizing how a user relates to a particular one of other communicants based on at least a statistical analysis of records describing interactions of the user and the particular communicant in a network communications environment comprising virtual places that constitute separate and distinct communication contexts that are associated with respective place attribute values and respectively support one or more modes of communication between communicants in the virtual places, wherein inferring the one or more relationship attribute values comprises;
   determining one or more values of one or more interaction parameters characterizing respective aspects of communicant interactions in the virtual places based on the respective place attribute values;
   computing one or more scores based on one or more of the determined interaction parameter values;
   ascertaining the one or more relationship attribute values based on the one or more scores;
storing the one or more relationship attribute values in at least one non-transitory computer-readable medium; and
managing one or more aspects of interactions of the user in the network communications environment that relate to the particular communicant in the network communications environment based on the one or more relationship attribute values.

2. The method of claim 1, wherein a relationship type taxonomy comprises a set of relationship type attribute values, and the inferring comprises selecting a respective one of the relationship type attribute values that characterizes a soda! network tie between the user and the particular communicant based on one or more of the place attribute values respectively associated with one or more of the virtual places in which the user and the particular communicant interact.

3. The method of claim 2, wherein the selecting comprises, for each relationship type attribute value in the taxonomy, calculating a respective score that depends on how consistent the interactions of the user and the particular communicant in the one or more virtual places are with the respective relationship type attribute value.

4. The method of claim 1, wherein one or more of the place attribute values comprise a place name attribute value that labels a respective one of the virtual places with a descriptive label, and inferring the one or more relationship attribute values is based on an intended use connoted by the place name attribute value.

5. The method of claim 1, wherein the place attribute values comprise place type class labels in a place type taxonomy.

6. The method of claim 1, wherein one or more of the place attribute values are explicitly declared by the user.

7. The method of claim 1, wherein one or more of the place attribute values are inferred from communicant interactions in the virtual place.

8. The method of claim 1, wherein the user is associated with a separate set of place attribute values for each virtual place in which the user interacts.

9. The method of claim 1, wherein the user is associated with a social network profile comprising relationship attribute values that are explicitly declared by the user, and further comprising automatically modifying one or more of the explicitly declared relationship attribute values based on the one or more inferred relationship attribute.

10. The method of claim 1, wherein inferring comprises determining one or more relationship level attribute values that respectively characterize a social network tie between the user and the particular communicant based on one or more of the place attribute values respectively associated with one or more of the virtual places in which the user and the particular communicant interact.

11. The method of claim 10, wherein the determining comprises deriving a first relationship level attribute value that indicates how well the user knows the particular communicant and a second relationship level attribute value that indicates how well the particular communicant knows the user.

12. The method of claim 10, wherein the social network tie between the user and the particular communicant is associated with multiple relationship type attribute values, and the determining comprises deriving a separate relationship level for each relationship type attribute value that is associated with the social network tie between the user and the particular communicant.

13. The method of claim 10, wherein the inferring comprises determining a trust level attribute value associated with the user based on a count of backward social network ties connecting other communicants to the user, respective relationship levels associated with the backward social network ties, and respective trust levels associated with the other communicants.

14. The method of claim 13, wherein the inferred trust level increases with the count of the backward ties and decreases with a count of forward ties emanating from the other communicants.

15. The method of claim 13, wherein the inferred trust level is associated with the user as a whole.

16. The method of claim 13, wherein the inferred trust level is associated with a declaration asserted by the user in the network communication environment.

17. The method of claim 13, wherein the inferred trust level depends on how consistent the interactions of the user are with the asserted declaration.

18. The method of claim 13, wherein the user is associated with a social network profile comprising attribute values that are explicitly declared by the user, and further comprising automatically modifying one or more of the explicitly declared attribute values based on the one or more inferred relationship attribute values.

* * * * *